United States Patent [19]

Hickok

[11] Patent Number: 4,752,830

[45] Date of Patent: Jun. 21, 1988

[54] TIME DIVISION MULTIPLEX VIDEO RECORDER WITH ENHANCED VERTICAL CHROMINANCE SAMPLING RATE

[75] Inventor: William K. Hickok, Rochester, N.Y.

[73] Assignee: Eastman Kodak Company, Rochester, N.Y.

[21] Appl. No.: 912,863

[22] Filed: Sep. 29, 1986

[51] Int. Cl.$^4$ .............................................. H04N 9/79
[52] U.S. Cl. .................................................. 358/310
[58] Field of Search ..................... 358/12, 14, 15, 310, 358/323, 327; 360/33.1

[56] References Cited

U.S. PATENT DOCUMENTS 4,654,697  3/1987  Sasson ..................................... 358/12
4,686,582  8/1987  Lovely ................................... 358/310

Primary Examiner—Robert L. Richardson
Attorney, Agent, or Firm—Robert M. Wallace

[57] ABSTRACT

A time division multiplex video recording system records every other one of the two chrominance signals (I and Q or R-Y and B-Y) of successive video fields and records the luminance signal (Y) of every field in separate time division segments. During odd fields, it records the luminance signal and the I chrominance signal of every horizontal line and during even fields it records the luminance signal with the Q chrominance signal of every horizontal line. During playback, a field store memory receives and stores the previously recorded chrominance signal of each field for repetition during the next to fill in for the unrecorded chrominance signal. In another embodiment, a helical scan four-head video playback system repeats every field during playback of the next field by playing back the adjacent tape tracks of both fields simultaneously, to fill in for the unrecorded chrominance signal (thereby eliminating the requirement for a field store memory). The invention represents a dramatic improvement because it achieves at least twice the vertical chrominance sampling rate of known time division multiplex video recording techniques.

15 Claims, 7 Drawing Sheets

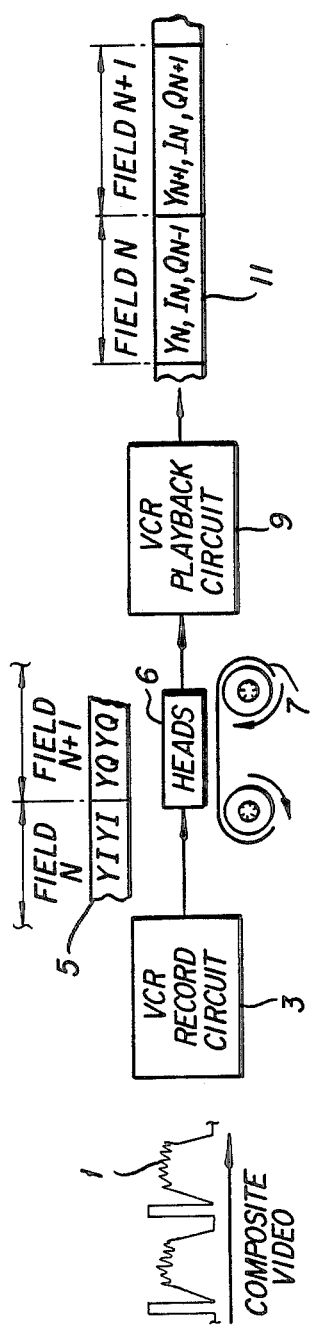
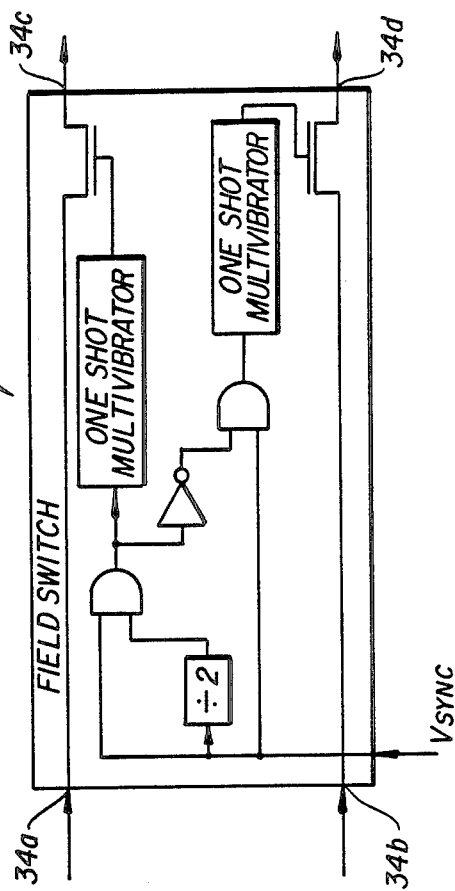
FIG. 1
FIG. 4

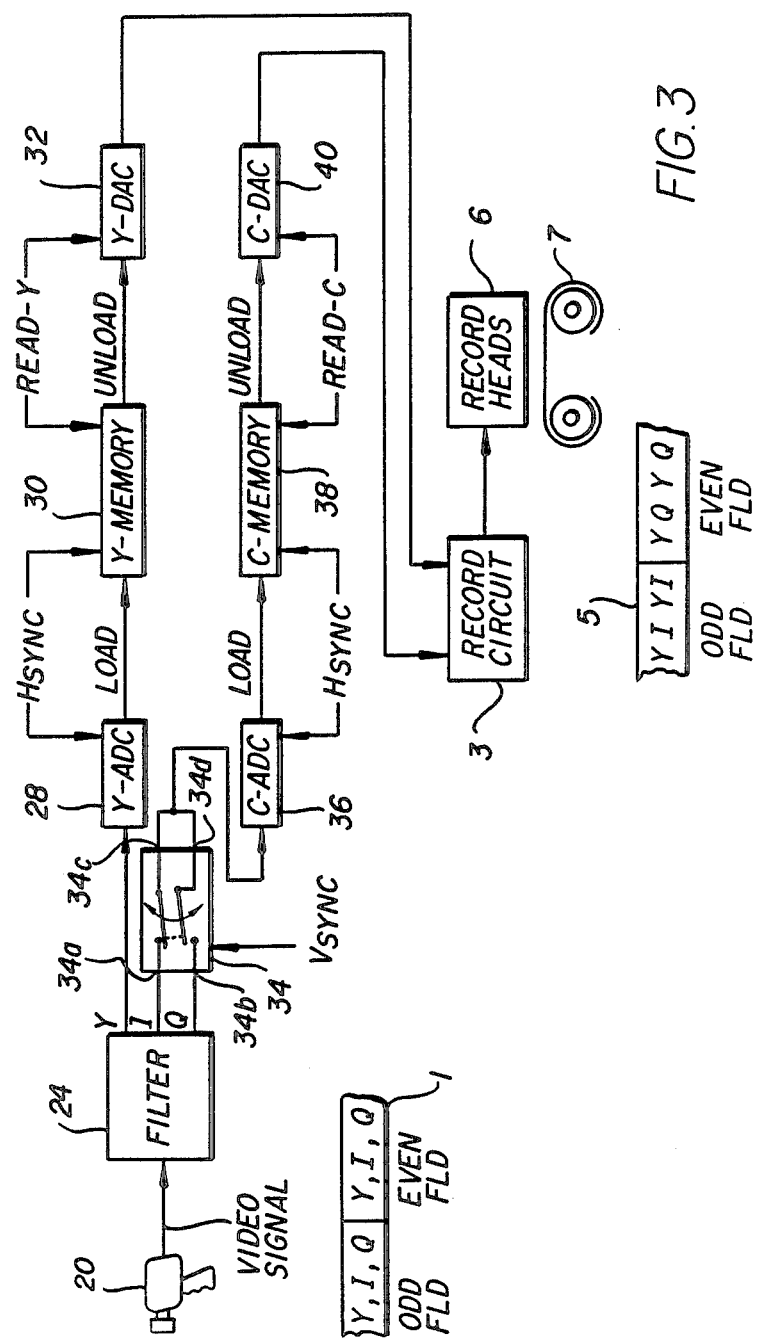

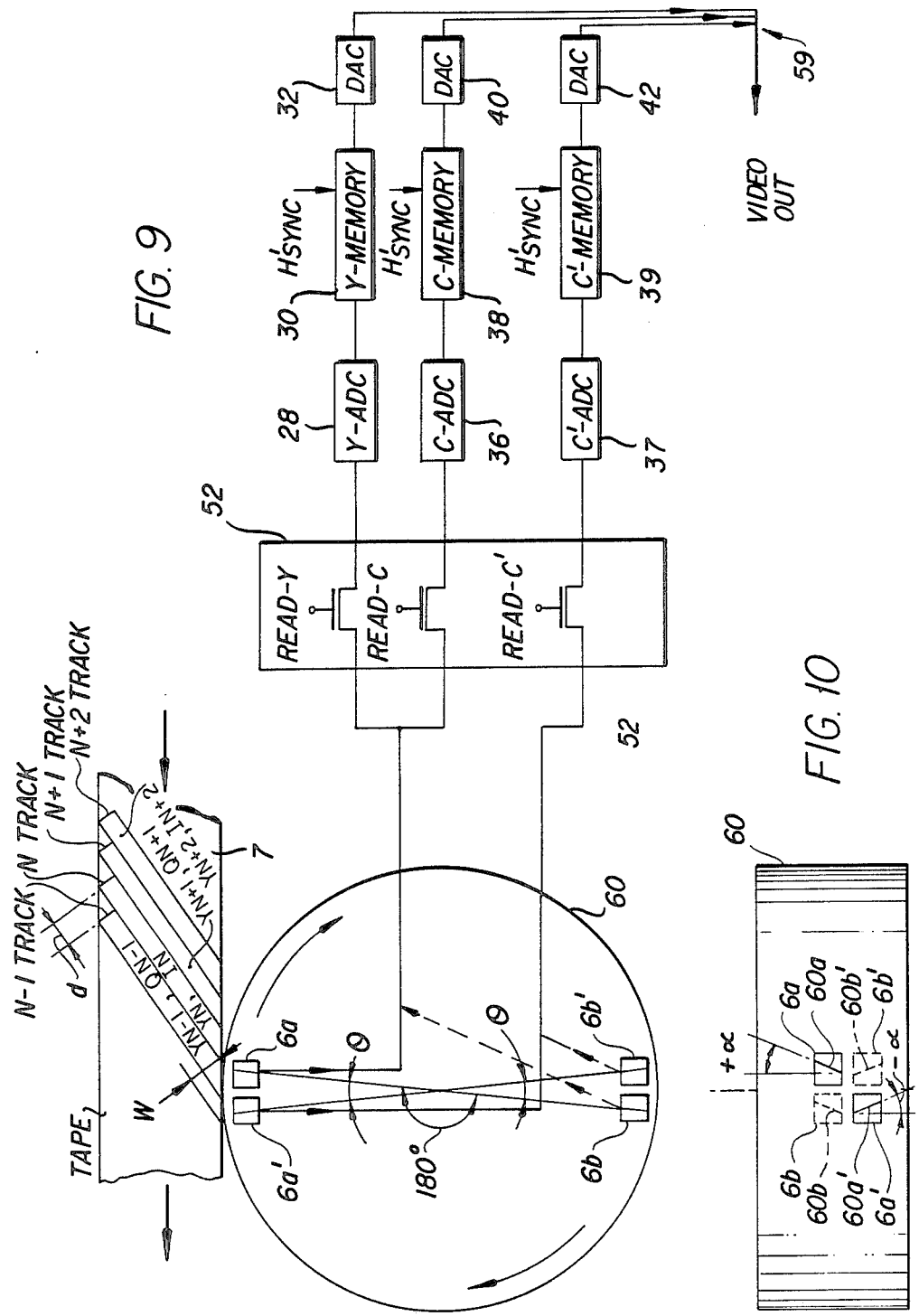

TIME DIVISION MULTIPLEX VIDEO RECORDER WITH ENHANCED VERTICAL CHROMINANCE SAMPLING RATE

BACKGROUND OF THE INVENTION

1. Technical Field

The invention relates to video recording systems and particularly to time division multiplex video cassette recorders.

2. Description of Related Art

In video cassette recorders (VCR's) there exists a trade-off between image quality and video cassette recording capacity. Image quality is proportional to tape speed while video cassette recording capacity is inversely proportional to tape speed. Two desires appear to drive consumer tastes, namely a desire for high image quality and a desire for compact video tape cassettes and (VCR's) with high recording-capacity. Increasing video cassette play time by reducing the tape speed reduces the recorded bandwidth and image resolution. However, the tape speed may be reduced without a proportionate decrease in image quality by using known techniques for non-destructively reducing the video signal bandwidth prior to recording.

A well-known technique for reducing the video signal bandwidth is time division multiplexing, which is described in U.S. Pat. No. 4,210,927. In typical time division multiplex (TDM) recording, the luminance component Y and the two chrominance components I and Q of each horizontal video line are separated, arranged in serial order and time compressed into one horizontal video line scan period.

Other techniques are known for reducing the video signal bandwidth even further. For example, U.S. Pat. Nos. 4,163,248 and 3,499,974 teach selectively sampling all video components (e.g. R, G and B; or Y, I and Q) in alternating fields. This method is undesirable in that some of the signal compression is achieved by dropping half the luminance samples, thus decreasing the resolution of the single most important component. A better technique for further reducing bandwidth is disclosed in U.S. Pat. No. 4,015,286 to Russell. In the Russell patent, the I and Q chrominance components of alternate video lines are time-compressed into the horizontal blanking interval. This unfortunately reduces the effective chrominance sampling rate in the vertical direction in each field by about a factor of four. A further disadvantage of the Russell patent is that time compressing the chrominance into such a short interval unduly limits the chrominance bandwidth and color resolution.

PROBLEM

In summary it does not seem possible to further reduce the tape speed in recording a TDM video signal without either reducing the vertical color sampling rate by a factor of four or reducing the luminance resolution. Therefore, there is a great need for a TDM video recording system which reduces the recorded bandwidth to permit a reduction in tape speed without reducing the vertical color sampling rate by a factor of four and without sacrificing luminance resolution.

SUMMARY OF THE INVENTION

In the invention, tape recording speed may be reduced without the usual sacrifice in image resolution.

SOLUTION TO THE PROBLEM

Specifically, a TDM recording system embodying the invention records every other one of the two chrominance signals I and Q of successive fields of a TDM video signal while recording the luminance signal Y of every field. For example, during the odd fields, the Y and I signals of every horizontal line are recorded as respective time division segments. During the even fields, the Y and Q signals of every horizontal line are recorded as respective time division segments. Thus, the even fields of I and the odd fields of Q are discarded. Such discarding reduces the amount of information to be recorded with each video line or field, thereby permitting a corresponding reduction in video tape speed and an attendant increase in video cassette play time, without a corresponding loss of image resolution. Recording every horizontal line of a given I or Q signal optimizes the vertical chrominance sampling rate in the playback image, a significant advantage. During playback, a field store memory receives and stores the previously recorded chrominance signal, I or Q, of the present field. The stored chrominance signal is played back during the next field to "fill in" for the unrecorded chrominance signal.

In an alternative embodiment, a four-head playback system repeats the recorded I or Q signal of each field during the next field to fill-in for the unrecorded chrominance signals, thereby eliminating the requirement for a field store memory. The four heads are arranged in opposing pairs on a rotary drum, the two heads in each pair being axially offset from one another so that they trace two adjacent tape tracks simultaneously. A filter separates the desired I or Q signal of the previous track for repetition with the present track. Preferably, the two heads in each pair are angularly offset from one another so that the repeated field is properly interlaced with the next field.

The main advantage of the invention is that it has at least twice the vertical chrominance sampling rate of prior TDM recording techniques in which alternate lines of the chrominance signals, I and Q, are skipped (such as the technique described in the Russell patent). Thus, the invention achieves a significant increase in the vertical chrominance sampling rate because it records every horizontal line of a given I or Q signal of each field.

In summary, the bandwidth of a TDM video signal is reduced (to permit recording at a slower tape speed) without reducing luminance resolution and without reducing the vertical chrominance sampling rate by a factor of four.

DESCRIPTION OF THE DRAWINGS

The invention may be understood by reference to the accompanying drawings, of which:

FIG. 1 is a block diagram of the present invention;

FIG. 3 is a simplified block diagram illustrating a video reproducing system embodying the invention and configured in the record mode;

FIG. 4 is a simplified logic diagram of a field switch used in FIG. 3;

FIG. 9 is a simplified illustration of a four-head video reproducing system embodying the invention and configured in the playback mode; and FIG. 10 is an elevational view of a four-head rotary drum of the system of FIG. 9.

DETAILED DESCRIPTION

General Concept

Figure 2A:
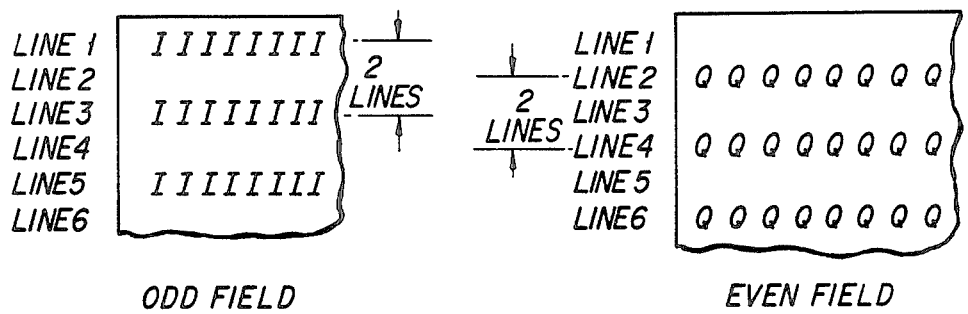
FIG. 2 includes diagrams of the chrominance pixels in successive interlaced fields in accordance with the invention (FIG. 2a) and in accordance with the prior art (FIG. 2b)

Referring to FIG. 1, a TDM VCR record circuit 3 receives an incoming composite video signal 1, separates it into its constituent signals Y, I, Q (or Y, R-Y, B-Y), and time division multiplexes the Y, I, Q signals while discarding I signal of every other field and the Q signal of remaining fields. The resulting TDM video signal 5 is recorded by magnetic heads 6 on a magnetic tape 7. The record circuit 3 transmits every horizontal line of the Y and I signals of odd video fields (for example), the Q signal being discarded, and transmits every horizontal line of the Y and Q signals of even video fields, the I signal being discarded. Discarding signals in this manner reduces the information that must be recorded for each video line or field, thereby permitting a corresponding reduction in tape speed.

A playback system 9 demultiplexes the recorded video signal and fills in for the discarded chrominance signal of one field by repeating the recorded chrominance signal of the preceding (or following) field. During the odd fields, in which the Y and I signals are played back, the Q signal from the previous (even) field is repeated. Conversely, during the even fields, in which the Y and Q signals are played back, the I signal from the preceding (odd) field is repeated. Thus, the playback system 9 synthesizes a composite video signal 11 comprising a Y signal and either a Q or I signal from one field accompanied by an I or Q signal, respectively, from the preceding (or following) field.

In FIG. 1, two fields, N and N+1 of the composite output video signal 11 are illustrated. The $Y_N$ and $I_N$ signals recorded during the $N^{th}$ field are played back simultaneously with the $Q_{N-1}$ signal recorded during the previous N−1 field. During the succeeding N+1 field, the $Y_{N+1}$ and $Q_{N+1}$ signals recorded from the N+1 field are played back simultaneously with the $I_N$ signal recorded during the previous N field.

Increase in Vertical Chrominance Sampling Rate

Figure 2B:
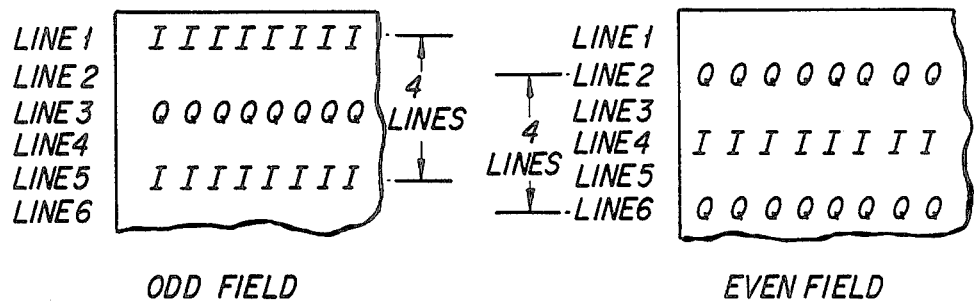

The advantage of the TDM recording system of FIG. 1 is that, for each video field, the effective chrominance sampling rate in the vertical direction is optimized (without any reduction in the luminance sampling rate). The I signal and the Q signal are recorded every horizontal line during odd and even fields, respectively, to store odd fields of I pixels and even fields of Q pixels, as illustrated in FIG. 2a. In each of the video fields illustrated in FIG. 2a, the effective vertical color sampling rate is one I pixel every two horizontal lines (or one Q pixel every two horizontal lines). In contrast, the prior art (as exemplified in the above-referenced Russell patent) teaches reducing TDM recorded bandwidth by recording the I signal of odd horizontal lines of every video field, and recording the Q signal of even horizontal lines of every video field. The resulting color sampling rate (FIG. 2b) is one I pixel every four horizontal lines (or one Q pixel every four horizontal lines), which is half the rate of the present invention. Because the vertical sampling rate is the lowest sampling rate in the video image (i.e. 60 Hz), a change by a factor of one-half in vertical chrominance sampling rate represents a significant difference in the resolution of the video image.

Record Mode

FIG. 3 illustrates a TDM video reproducing system embodying the invention and configured in the record mode. A video source 20 generates the incoming composite video signal 1. A filter 24 separates each horizontal line of the video signal 1 into its constituent Y, I, Q component signals. The Y signal is converted to digital form in a Y-analog-to-digital converter (ADC) 28 and loaded, in synchronism with the horizontal synchronization ($H_{sync}$) pulse of the video signal 1, into a Y-memory 30. Each horizontal line of Y signal data stored in the Y-memory 30 is unloaded into a Y-digital-to-analog converter (DAC) 32 during a luminance time division interval, in synchronism with a READ-Y signal (FIG. 6a), at a faster rate than it was loaded into the memory 30 in order to time-compress the Y signal. The duration of the READ-Y signal is therefore shorter than the period between $H_{sync}$ pulses.

Alternate ones of the I and Q signals of successive video fields are routed through a field switch 34 to a C-ADC 36 and thence to a C-memory 38. The field switch 34 changes state with the occurrence of each $V_{sync}$ pulse so as to route just the I signal of odd video fields to the C memory 38 and to route just the Q signal of the even video fields to the C memory 38.

One implementation of the field switch 34 is illustrated in the simplified logic diagram of FIG. 4. The field switch 34 has two inputs 34a, 34b and two outputs 34c, 34d. Each of the One Shot Multivibrators of FIG. 4 has a pulse width equal to the duration, ([1/60] sec.) of a video field and has a delay of approximately zero.

Loading of a horizontal video line of the I or Q signal into the C-memory 38 occurs in synchronism with the $H_{sync}$ pulse and simultaneously with the loading of the same horizontal video line of the Y signal into the Y-memory 30.

Figure 6:
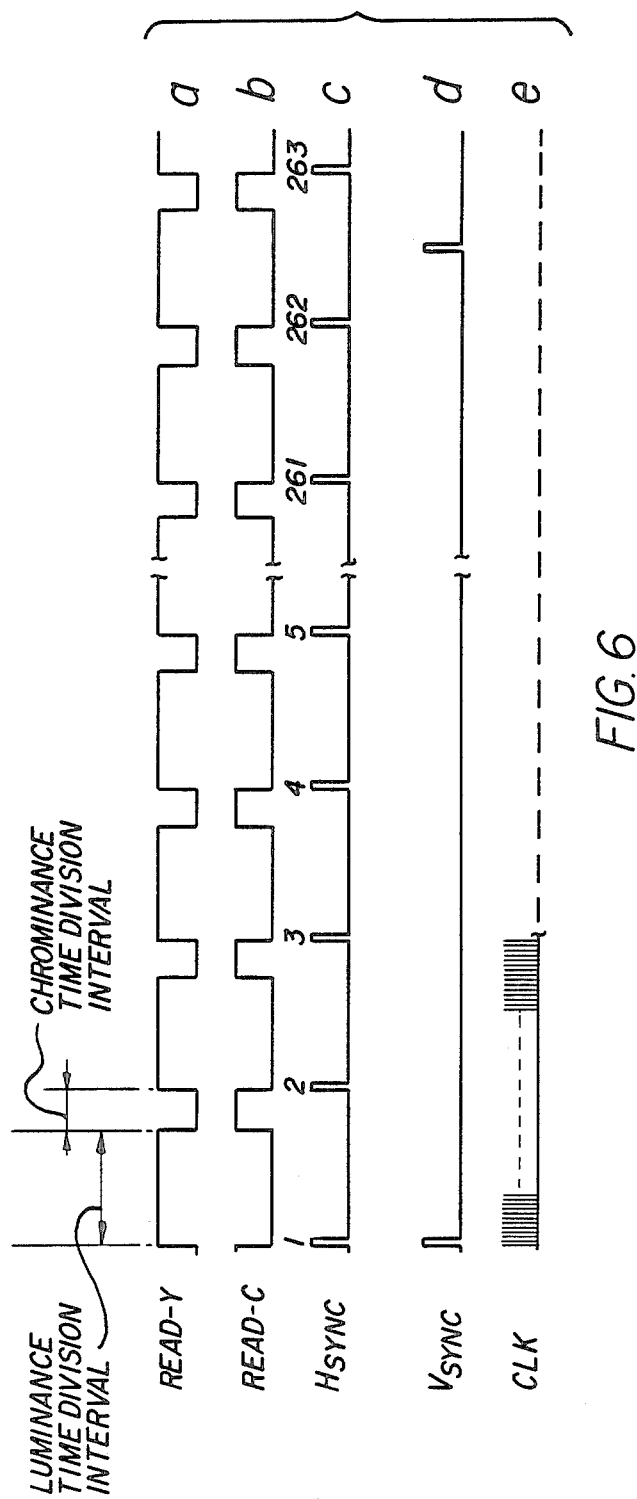
FIG. 6 includes contemporaneous timing diagrams illustrating the operation of the playback system of FIG. 5.

Each horizontal line of video data stored in the C-memory 38 is unloaded into a C-DAC 40 in synchronism with a READ-C signal (FIG. 6b) during a chrominance time division interval at a faster rate than it was loaded into the C-memory 38 in order to time-compress the I and Q signals. The duration of the READ-C signal is therefore shorter than the period between $H_{sync}$ pulses. Preferably, the sum of a luminance and a chrominance time division interval equals the $H_{sync}$ pulse period. As illustrated in FIGS. 6a and 6b, the READ-Y and READ-C signals are complementary so that the Y- and C-memories 30, 38 are unloaded during the respective luminance and chrominance time division intervals.

The unloaded luminance and chrominance signals are converted in the Y- and C-DAC's 32, 40, respectively, and processed by the record circuits 3 to form the multiplexed video signal 5, which is then applied to the heads 6.

The Y- and C-memories 30, 38 may each comprise (for example) a large serial shift register providing a digital storage capacity equivalent to one horizontal line of video data. The Y- and C-memories 30, 38 are operated so that each horizontal line of video data is loaded into the memories 30, 38 while, simultaneously, the previous line of video data is being unloaded from the memories 30, 38.

Field Store Memory Playback System

Figure 5:
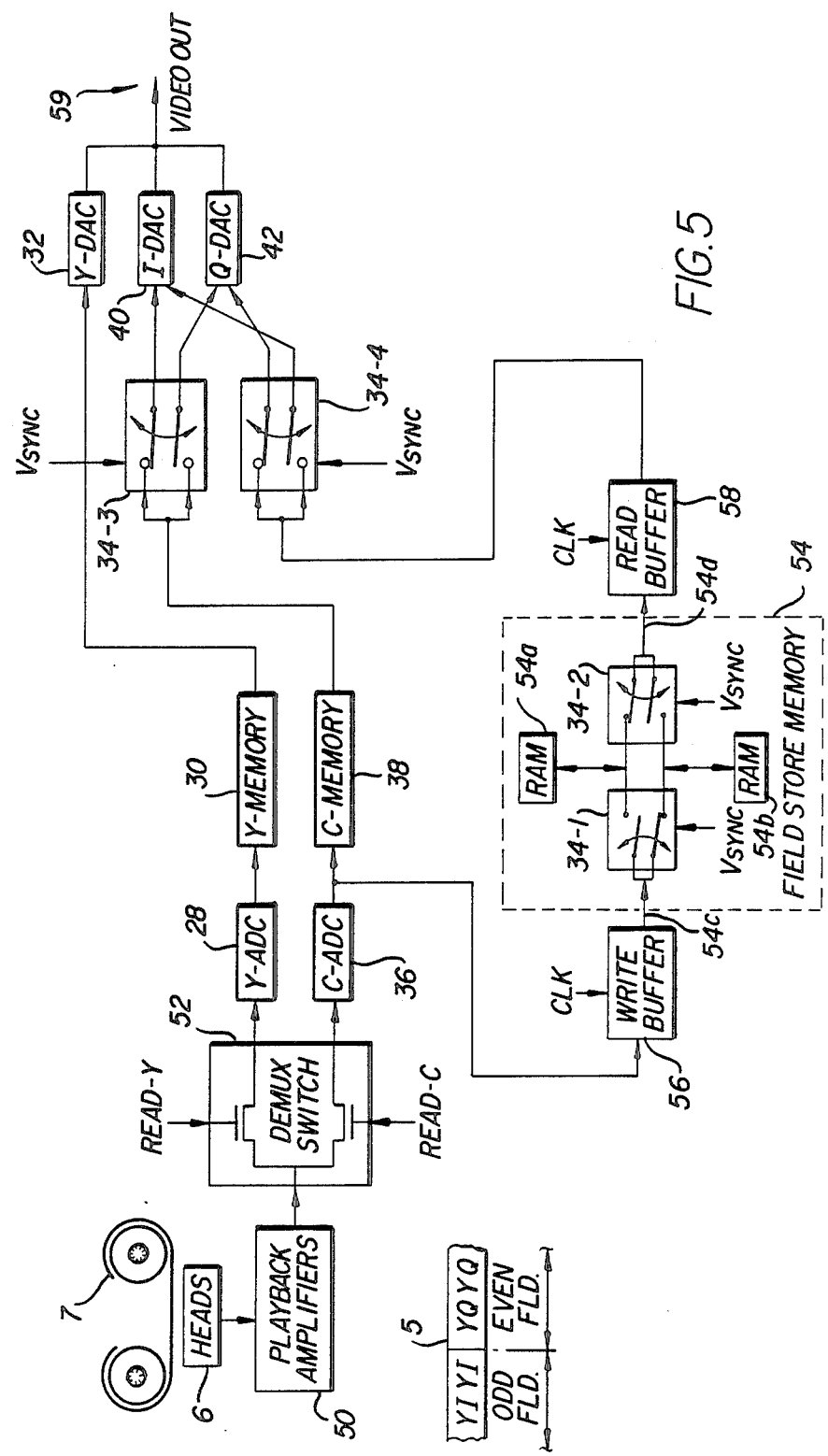
FIG. 5 is a simplified block diagram illustrating a video reproducing system embodying the invention and configured in the playback mode.

FIG. 5 illustrates a TDM video reproducing system embodying the invention and configured in the playback mode. Each horizontal line of the TDM video signal 5 picked up by the heads 6 is transmitted by playback amplifiers 50 to the input of a demultiplexing switch 52. The demultiplexing switch 52 operates in synchromism with the READ-Y and READ-C signals (FIGS. 6a and 6b). The switch 52 routes the incoming video signal 5 through the Y-ADC 28 to the Y-memory 30 during each luminance time division interval. During each chrominance time division interval, the switch 52 routes the incoming signal 5 through the C-ADC 36 to both the C memory 38 and a field store memory 54.

The field store memory 54 comprises two addressable memories such as random access memory (RAM) integrated circuits (I.C.'s) 54a, 54b which are accessed separately through two ports 54c, 54d. Each of the ports 54c, 54d is connected to a different one of the two RAM I.C.'s during successive video fields by two field switches 34-1, 34-2 (of the type illustrated in FIG. 4) so that the RAM I.C.'s 54a, b are "double buffered". A write address buffer 56 controls the loading of video data through one port 54c into the field store memory 54. A read address buffer 58 controls the unloading of video data through the other port 54d from the field store memory 54. During each odd field, the playback I signal is loaded into the C-memory 38 and into one of the RAM I.C.'s (e.g. 54a) on a line-by-line basis. During each even field, the playback Q signal is loaded into the C-memory 38 and into the other RAM I.C. (e.g. 54b) on a line-by-line basis while the previously stored I signal is unloaded, line-by-line, from the one RAM I.C. (54a).

A given horizontal line of the Y signal and either the I or Q signal is read out from the Y and C memories 30, 38, respectively, while simultaneously, the Q or I signal, respectively, of a corresponding line in the previous field is unloaded from the field store memory 54, all in synchronism with the $H_{sync}$ pulse. Field switches 34-3, 34-4 (of the type illustrated in FIG. 4) route the I and Q signals from the C-memory 38 and the field store memory 54 into I- and Q-DAC's 40 and 42, respectively. The field switch 34-3 routes I signals from the C-memory 38 to the I-DAC 40 during odd fields and routes Q signals from the C-memory 38 to the Q-DAC 42 during even fields. The field switch 34-4 routes Q signals from the field store memory 54 to the Q-DAC 42 during odd fields and routes I signals from the field store memory 54 to the I-DAC 40 during even fields.

The Y signals read out from the Y-memory 38 are fed directly to the Y-DAC 38. The analog output of the Y, I and Q signals of the DAC's 38, 40, 42 are fed simultaneously to an output port 59 and combined to produce the composite output video signal 11 of FIG. 1. In an alternative embodiment, the output port 59 has three terminals to which the analog output Y, I and Q signals are fed separately without being combined.

Field Store Memory Addressing

Figure 7:
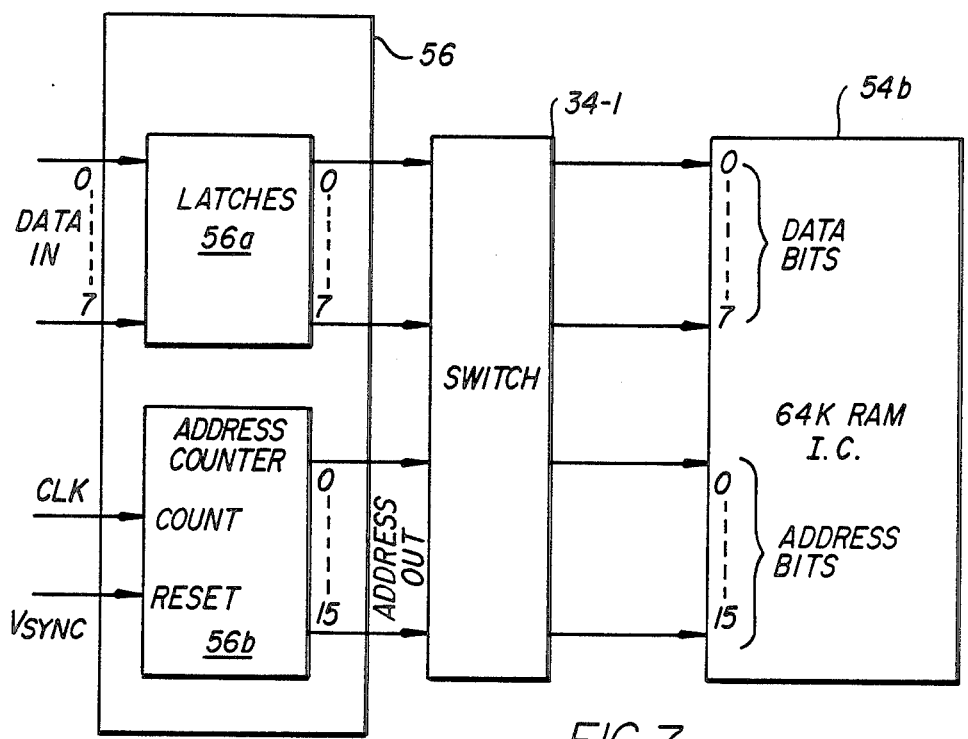
FIG. 7 is a detailed diagram of a portion of the system of FIG. 5.

FIG. 7 is a detailed block diagram of one portion of the embodiment of FIG. 5, including the write buffer 56, the switch 34-1 and the RAM I.C. 54b. In the embodiment of FIG. 7, the RAM I.C. 54b is a 64K-byte RAM having eight data bit terminals and sixteen address bit terminals. The write buffer 56 includes a set of eight data latches 56a and a sixteen-bit address-generating counter 56b. The set of latches 56a simultaneously applies the eight data bits of each sample, or byte, of video data (through the switch 34-1) to the eight data bit terminals of the RAM I.C. 54b in synchronism with a byte-rate clock signal CLK (FIG. 6e). The address counter 56b is a synchronous counter which resets with the occurrence of each $V_{sync}$ pulse. The sixteen output bits of the counter 56b are applied through the switch 34-1 to the sixteen address bits of the RAM I.C. 54b. The counter 56b counts up in synchronism with the clock signal CLK to generate a different sixteen-bit address for each byte of data transmitted from the latches 56a to the RAM I.C. 54b. The data representing each horizontal video line comprises n eight-bit bytes (or samples), where n is on the order of 240, and occupies n different address locations in the RAM I.C. 54b. The CLK signal of FIG. 6e has a pulse frequency equal to n multiplied by the $H_{sync}$ pulse frequency.

Figure 8:
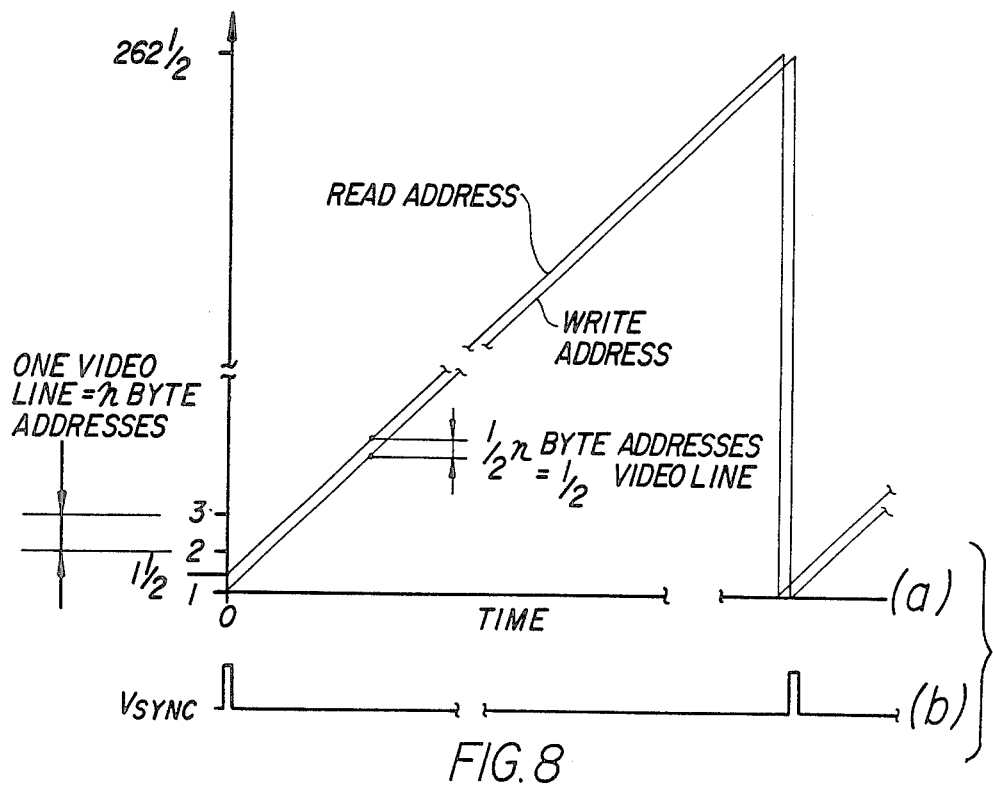
FIG. 8 includes contemporaneous timing diagrams illustrating the operation of the field store memory of FIG. 5.

The output of the sixteen-bit address-counter 56b constitutes the "write" address where an incoming data byte is to be stored in memory. Operation of the write buffer 56 is illustrated in FIG. 8. The write address (FIG. 8a) increases linearly in synchronism with the CLK signal, beginning with the first byte of video line 1, and is reset upon reaching the last byte half way through video line 263 (i.e. $262\frac{1}{2}$), corresponding to the occurrence of the $V_{sync}$ pulse (FIG. 8b).

The operation of the read buffer 58 of FIG. 5 is similar, the read buffer 58 generating a read address (FIG. 8a) applied to the other RAM I.C. 54a, which increases linearly and is reset with the occurrence of the $V_{sync}$ pulse. In this example, the write and read addresses are applied to the RAM I.C.'s 54b, 54a, respectively. During the next video field, the switches 34 have changed state so that the write and read addresses are applied to the RAM I.C.'s 54a, 54b, respectively.

As shown in FIG. 8a, the read address generated by the read buffer 58 is offset with respect to the write address of the write buffer 56 by $(\frac{1}{2})$n (i.e., one half of one horizontal video line). Referring to FIG. 5, this offset provides the requisite half-line interlacing at the output port 59 between the I (or Q) signal of the present field transmitted from the C-ADC 30 and the Q (or I) signal of the previous field unloaded from the field store memory 54.

Other implementations of the embodiment of FIG. 5 are possible. As one example, the Y-memory 30 and the C-memory 38 may each comprise a pair of double-buffered RAM I.C.'s rather than a serial shift register.

Four Head Playback System

FIG. 9 illustrates a four-head video reproducing system embodying the invention and configured in the playback mode. In the embodiment of FIG. 9, signals previously recorded by the embodiment of FIG. 3 or its equivalent are played back without requiring a field store memory to fill in for the unrecorded chrominance signals (such as the field store memory 54 of FIG. 5). A rotating drum 60 supports two pairs of magnetic heads 6a, 6a', and 6b, 6b', the two heads in each pair (e.g. the heads 6a, 6a') being offset by an angle θ (which is preferably small), and the corresponding heads of opposing pairs (e.g. the heads 6a, 6b) being displaced from one another by 180°.

The axial displacement H (shown in FIG. 10) between the two adjacent heads within each pair (e.g. 6a, 6a') is such that the two adjacent heads simultaneously trace two adjacent tracks on the tape 7. Accordingly, H is proportional to the width W of one recorded track on the tape 7. The fields N−1, N,N+1 and N+2 are recorded on the tape 7 in the N−1,N,N+1 and N+2 tracks, respectively, as shown in FIG. 9.

During the first half (180°) rotation of the drum 60, the first head 6a picks up Y and I signals from the N track while, simultaneously, the second head 6a' picks up Y and Q signals from the N−1 track. During the next half rotation, the third head 6b picks up Y and Q signals from the N+1 track while the fourth head 6b' picks up Y and I signals from the N track.

The Y signal, picked up during odd half rotations by the head 6a and during even half rotations by the head 6b, is fed by the demultiplexing switch 52 (in synchronism with the READ-Y signal of FIG. 6a) through the Y-ADC 28 to the Y-memory 30. The I signal picked up by the head 6a during odd half-rotations and the Q signal picked up by the head 6b during even half-rotations are fed by the switch 52 (in synchronism with READ-C clock signal of FIG. 6b) through the C-ADC 36 to the C-memory 38. The Q signal picked up by the head 6a' during odd half rotations and the I signal picked up by the head 6b' during even half rotations is fed by the switch 52 (in synchronism with the READ-C signal) through a C'-ADC 37 to a C'-memory 39. (The C'-ADC 37 and C'-memory 39 are similar to the C-ADC 36 and C-memory 38, respectively.) During the first (odd) half rotation of the drum 60, the I signals of the first odd field are fed to the C-memory 38 while the Q signals of the previous field are fed to the C'-memory 39. During the next (even) half rotation of the drum 60, the Q signals of the first even field are fed to the C-memory 38 and the I signals of the preceding first odd field are fed to the C'-memory 39.

The Y, I and Q signals of a given horizontal video line stored in the memories 30, 38, 39 are simultaneously read out from the memories 30, 38, 39 in synchronism with an H'$_{sync}$ pulse, corresponding to the H$_{sync}$ pulse of the recorded video signal. The signals are converted in the DAC's 32, 40, 42 and fed simultaneously to the output port 59. The resulting video output signal is identical to the video signal 11 of FIG. 1 generated by the playback system of FIG. 5.

Preferably, if the playback system of FIG. 9 is of the guard-bandless type, then the gaps of 60 the magnetic head 6 are canted at different angles of azimuth +α, −α, in order to suppress crosstalk between adjacent tracks. Thus, the heads 6a, 6b' have their head gaps canted at one angle of azimuth (+α) while the heads 6b, ba' have their head gaps canted at another angle of azimuth (−α), as indicated in FIG. 10.

Interlacing Chrominance Signals Of Adjacent Fields

The rotational rate of the drum 60, the velocity of the tape 7 and the angle of the helical tape-wrap around the periphery of the drum 60 together establish a linear track offset distance d (FIG. 9) between adjacent tracks, in accordance with well-known principles. The offset angle θ (FIG. 9) between adjacent heads 6 is selected with respect to the linear track offset distance d so as to properly interlace the video signals picked up simultaneously by adjacent heads. For example, if d corresponds to one half of a horizontal video line, and if the odd and even interlaced video fields are offset by one-half of a horizontal video line, then θ is selected to subtend an arc distance of 2d along the periphery of the drum 60.

While the embodiment of FIG. 9 has been described as combining the luminance and one chrominance signal of a given video field with the other chrominance signal of the previous field, it is equally suitable for combining the luminance and one chrominance signal of a given field with the other chrominance signal of the next field by simply exchanging the electrical connections to the adjacent heads (e.g. 6a, 6a') shown in FIG. 9.

While the invention has been described in detail with particular reference to preferred embodiments thereof, it is understood that variations and modifications may be made within the spirit and scope of the invention.

What is claimed is:

1. A time division multiplex video reproducing system including recording means for recording a luminance signal and two chrominance signals of interlaced odd and even video fields of an incoming video signal onto a video tape, said recording means comprising:
   means for time compressing each video line of said luminance signal of said odd and even fields into odd and even ones of a succession of luminance time division segments;
   means for time compressing each video line of one of said chrominance signals of odd ones of said fields into odd ones of a succession of chrominance time division segments and for time compressing each video line of the other of said chrominance signals of even ones of said fields into even ones of said succession of chrominance time division segments;
   magnetic head means; and
   multiplexing means for transmitting said segments, one at a time, to said magentic head means so that odd and even pairs of said luminance and chrominance segments are sequentially recorded on said video tape, whereby at least nearly every video line of said one and other chrominance signals of said odd and even video fields, respectively, is recorded on said video tape adjacent the corresponding luminance signal, wherein the number of luminance samples in each field is at least nearly as great as that of said incoming video signal, and the number of video lines of said one and other chrominance signal in said odd and even video fields, respectively, is at least nearly one half that of said incoming video signal.

2. The system of claim 1 further comprising playback means, said playback means comprising:
   demultiplexing means connectable to said magnetic head means for sensing and separating said sequentially recorded segments into groups of luminance and chrominance segments;
   means connected to said demultiplexing means for combining said luminance signal and said one and other chrominance signals of said odd and even video fields, respectively, with said other and one recorded chrominance signals of even and odd ones of said video fields, respectively.

3. The video recorder of claim 2 wherein said combining means comprise:

an output port;
first means connected to said demultiplexing means for transmitting said luminance signal and one chrominance signal of one of said fields to said output port during playback of said one video field; and
second means connected to said demultiplexing means for transmitting the other chrominance signal of another video field to said output port during playback of said one video field.

4. The video recorder of claim 3 wherein said second means comprise:
a field store memory;
means for loading into said field store memory said other chrominance signal during playback of said other video field; and
means for unloading from said field store memory said other chrominance signal during playback of said one video field, whereby each of said video fields are reproduced with a chrominance signal from another video field.

5. The video recorder of claim 3 wherein:
(a) said magnetic head means comprise:
 (1) a rotatable head drum;
 (2) a first pair of magnetic heads mounted on said drum and being spaced apart from one another by about 180°;
 (3) means for connecting said multiplexing means to said first head pair;
 (4) means for rotating said drum while transporting said tape around said drum, whereby successive ones of said video fields are recorded in successive parallel tracks on said tape;
(b) said second means comprise:
 (1) a second pair of magnetic heads mounted on said drum surface near said first head pair and axially offset therefrom by a distance corresponding to the width of each of said parallel tracks, whereby said first and second head pairs are adapted to simultaneously trace over adjacent respective ones of said tape tracks; and
 (2) means for connecting said demultiplexing means to said second head pair, whereby said demultiplexing means senses, simultaneously, said one chrominance signal through said first head pair and the other chrominance signal through said second head pair, whereby each of the video fields is reproduced with a chrominance signal from an adjacent field.

6. The system of claim 1 wherein:
(a) said means for time compressing said luminance signal comprise:
 (1) a Y-memory;
 (2) means for loading one video line of said luminance signal into said Y-memory in synchronism with the line frequency of said incoming video signal;
 (3) means for unloading said one luminance signal video line from said Y-memory during a corresponding one of said successive luminance time division segments;
(b) said means for time compressing said chrominance signals comprise:
 (1) a C-memory;
 (2) means for loading into said C-memory one video line of said one chrominance signal during odd video fields and one video line of said other chrominance signals during even video fields; and
 (3) means for unloading from said C-memory each horizontal line of said one and other chrominance signals during odd and even ones of said successive chrominance time division segments, respectively.

7. A time division multiplex video tape player for reproducing successive video fields previously recorded in successive parallel tracks on a video tape, odd ones of said recorded video fields comprising a luminance signal and one of two chrominance signals, even ones of said recorded video fields comprising a luminance signal and the other chrominance signal, each video line of said luminance and chrominance signals being time compressed into serial luminance and chrominance time division segments, respectively, said video tape player comprising:
magnetic head means for sensing said previously recorded signals from said video tape;
demultiplexing means connectable to said magnetic head means for receiving and separating said serial segments into groups of luminance and chrominance segments;
an output port;
means connected to said demultiplexing means for simultaneously transmitting the separated luminance and one chrominance segment of each one of said video fields and the other chrominance segment of an adjacent video field to said output port.

8. The video player of claim 7 wherein said demultiplexing means comprise:
first means for storing said odd luminance and chrominance segments during playback of respective ones of said video lines of respective odd video fields; and
second means for storing said even chrominance segments during playback of respective video lines of respective even video fields;
third means for unloading corresponding video lines of said signals from said first and second means simultaneously, whereby said luminance and one chrominance signal of each respective video field and said other chrominance signal of another respective video field are reproduced simultaneously.

9. The video player of claim 8 wherein said second means comprise:
a field store memory;
means connected to said first means for loading into said field store memory said other chrominance signal during playback of said even fields;
means for unloading from said field store memory said other chrominance signal during playback of said odd fields, whereby each of said video fields is played back with a chrominance component from an adjacent video field.

10. The video player of claim 8 wherein:
(a) said magnetic head means comprise:
 (1) a rotary drum;
 (2) a first pair of magnetic heads mounted on said drum and being spaced from one another by about 180°;
 (3) means for transporting said tape around said drum;
(b) said second means comprise:
 (1) a second pair of magnetic heads mounted on said drum near said first head pair and axially offset therefrom by a distance corresponding to the width of each of said parallel tracks, whereby said first and second head pairs are adapted to trace two adjacent ones of said tracks simultaneously; and (2) means for connecting said demultiplexing means to said second head pair, whereby said demultiplexing means senses simultaneously the luminance and one chrominance signal through said first head pair and the other chrominance signal through said second head pair, whereby each of the video fields is reproduced with a chrominance signal from an adjacent video field.

11. A time division multiplex video tape player for reproducing successive video fields previously recorded in successive parallel tracks on a video tape, odd ones of said recorded video fields comprising a luminance signal and one of two chrominance signals, even ones of said recorded video fields comprising a luminance signal and the other chrominance signal, each video line of said luminance and chrominance signals being time compressed into serial luminance and chrominance time division segments, respectively, said video tape player comprising:

a rotary drum;

a first pair of magnetic heads mounted on said drum and being spaced from one another by about 180°;

a second pair of magnetic heads mounted on said drum and being spaced from one another by about 180° and being located adjacent said first pair of magnetic heads and axially offset therefrom by a distance H corresponding to the width of each of said parallel tracks, whereby said first and second head pairs are adapted to trace two adjacent ones of said track simultaneously;

means for transporting said tape around said drum while rotating said drum;

demultiplexing means connectable to said first and second pairs of magnetic heads for receiving and separating said time division segments in groups of luminance and chrominance segments;

an output port;

time decompressing means connectable to said demultiplexing means for transmitting to said output port one video line of the luminance signal and one chrominance signal of a video field and a corresponding video line of the other chrominance signal of another video field to said output port, whereby each of the video fields is reproduced with a chrominance signal from another field.

12. The video tape player of claim 11 wherein said first head pair is angularly offset from said second head pair by an angle $\theta$ such that said one chrominance signal of said one video field is interlaced with said other chrominance signal of said other video field.

13. The video tape player of claim 12 wherein said plurality of parallel tracks is characterized by a linear track offset distance d between adjacent tracks, and wherein $\theta$ subtends an arc distance between adjacent heads equal to an integral multiple of d.

14. The video tape player of claim 11, 12 or 13 wherein each of said heads is characterized by a head gap, and wherein the head gap of said first and second head pairs are canted at first and second angles of azimuth, $+\alpha$ and $-\alpha$, respectively.

15. The device of claim 4 or 9 wherein said memory loading and unloading means operate simultaneously to load and unload odd and even interlaced video fields in and out of said memory respectively, and wherein one of said loading and unloading means is delayed with respect to the other by an interval corresponding to one half of one video line, whereby to interlace one chrominance component of one field with the other chrominance component of the next video field.

* * * * *